United States Patent [19]
Baiera et al.

[11] Patent Number: 5,991,547
[45] Date of Patent: *Nov. 23, 1999

[54] ATTENTION ATTRACTOR FOR VIEWING DEVICE

[75] Inventors: Vincent A. Baiera, 2035 Haring St., Brooklyn, N.Y. 11229; Robert F. Cavellier, West Palm Beach, Fla.

[73] Assignee: Vincent A. Baiera, Brooklyn, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/833,666

[22] Filed: Apr. 8, 1997

[51] Int. Cl.⁶ ..................................................... G03B 17/02
[52] U.S. Cl. .................................. 396/6; 396/544; 446/73
[58] Field of Search ............................... 396/6, 429, 535, 396/544; 446/72, 73, 74; 359/408

[56] References Cited

U.S. PATENT DOCUMENTS

| | | |
|---|---|---|
| D. 270,839 | 10/1983 | Greif . |
| D. 289,409 | 4/1987 | Colani . |
| D. 289,658 | 5/1987 | Colani . |
| D. 349,124 | 7/1994 | Tugendhaft . |
| D. 351,178 | 10/1994 | Pijlman . |
| 4,736,220 | 4/1988 | Heinzelmann . |
| 4,751,536 | 6/1988 | Ohmura et al. ............................. 396/6 |
| 4,864,333 | 9/1989 | Barber . |
| 4,907,022 | 3/1990 | Myers . |
| 5,250,973 | 10/1993 | Pijlman . |

OTHER PUBLICATIONS

"MICK–A–MATIC" advertisement, Modern Plastics, Sep. 1978, p. 28, Sep. 1970.

*Primary Examiner*—Howard B. Blankenship
*Attorney, Agent, or Firm*—Wood, Herron & Evans, L.L.P.

[57] ABSTRACT

An attention attracting article for a viewing device, such as a camera or a pair of binoculars, is preferably die cut from a single sheet of cardboard and folded around the viewing device to define an enclosure therefor, the attention attractor including a character with a head extending outwardly from the enclosure and hands on the enclosure so that from a vantage point facing the viewing device, it appears as if the character is holding the viewing device and looking therethrough. Particularly when the viewing device is a camera, the attention attracting article helps retain a child's attention when it is desired to take a photograph of the child, because the child believes that the familiar character is encouraging interaction with the camera, rather than concealment of the camera. When used with binoculars, the article attracting device is primarily for amusement, although it could also be used to encourage children to use binoculars and perhaps arouse their curiosity about optical principals.

22 Claims, 4 Drawing Sheets

ATTENTION ATTRACTOR FOR VIEWING DEVICE

FIELD OF THE INVENTION

This invention relates generally to viewing devices, and more particularly to an attention attractor which is advantageous in attracting the attention of a child to the viewing device.

BACKGROUND OF THE INVENTION

It is known to attach an attention diverter to the front a camera to divert the attention of a child when the child is being photographed. Heinzelmann U.S. Pat. No. 4,736,220 discloses an "Attention Diverter For Camera," an attention diverter in the form of a fanciful person or animal with a body mounted to the front end of a camera. The legs of the person or animal hang down on the opposite sides of the lens, and have accordion style folds, for assisting in diverting the attention of a child. Barber U.S. Pat. No. 4,864,333 discloses a "Camera and Facade" which appears to be, in effect, a human face facade which is strapped onto the front surface of the camera. The lens of the camera aligns with one of the eyes of the human face facade.

For both of these structures, the attention diverter attaches to the front of the camera and includes at least some additional hardware, such as one or more straps, for securement to the camera. These devices primarily attempt to conceal the camera from the child to create the effect that a photograph is not being taken. This represents one way to divert the attention of a child when it is desired to take a photograph, by effectively concealing the camera.

As technology moves forward, many utilitarian devices have become lower in cost and simpler in structure. Known devices, such as cameras, have even become disposable, with a box-like cardboard housing used to surround the structural components of a typical portable camera. The device is bought as one package, used to take a predetermined number of photographs from a single roll of film, and then when it is time to develop the photographs, the cardboard housing is discarded or recycled, and the film is retrieved from the internal camera components for development. The camera components may then be reused within another 'disposable' cardboard housing. Because of the typically box-like shape of such disposable cameras, such cameras do not readily lend themselves to use in conjunction with attention diverters of the type described above.

SUMMARY OF THE INVENTION

It is an object of the invention to improve upon the versatility and adaptability of various types of viewing devices, particularly disposable cameras, so that such a viewing device may be more enthusiastically accepted by a child.

It is another object of the invention to attract a child's attention to a viewing device, such as a camera, via an approach other than concealment of the viewing device.

It is still another object of the invention to structurally simplify and lower the cost of articles used to attract a child's attention to a viewing device, such as a camera.

The present invention achieves the above-stated objectives via a character extending from a box-like enclosure which surrounds a viewing device, so that to an observer looking at the viewing device it appears as if the character is looking through the viewing device. For a camera, it appears as if the character is holding the camera and looking therethrough to take a photograph.

Particularly for a child, and depending upon the character, this invention attracts the attention of the child by creating the impression that the character is using the camera to take the photograph. Stated another way, the thrust of this invention is not to conceal the viewing device, but to create in the mind of the child being photographed the impression that a character, preferably a lovable cartoon character, wishes to use the device to take the child's photograph. Thus, with respect to use of a camera to photograph a child, this invention represents a different approach than the concealment or diversion approach used with the above described prior art patents.

According to a preferred embodiment of the invention, the attention attractor is die cut from a single blank of material, preferably cardboard, and folded around the viewing device to define a box-shaped enclosure therefor, with a character extending upwardly from a rear side of the viewing device. With head indicia applied to the character to appear as a head for the character, and hand indicia also included on the enclosure, to an observer looking at the camera from the front it appears as if the character is holding the camera. For extra stability, the upwardly extending head portion of the character has a dual ply thickness. Although the head of the character preferably extends upwardly from the rear side of the viewing device, it may extend in other directions, or even from the front side, so long as it appears from the front that the character is interacting in some way with the viewing device.

For use in connection with a disposable camera, the attention attractor is die cut and formed around the conventional plastic housing of a disposable camera by folding and applying sufficient adhesive to the overlapping tabs. Alternatively, the character, i.e., the head and hands, could be attached directly to a plastic or cardboard housing of a disposable camera. As a further alternative, the attention attractor of this invention could actually be used instead of the conventional plastic housing of a disposable camera, to provide the structural support for the photograph-taking components of the disposable camera. This would eliminate the need to apply the character to the viewing device as a separate piece of enclosing material.

In addition to cameras, the invention is also applicable to other viewing devices, such as a pair of binoculars, which are currently also available in disposable cardboard form.

These features of the invention will be more readily understood in view of the following detailed description of the drawings.

DETAILED DESCRIPTION OF THE DRAWINGS

Figure 1:
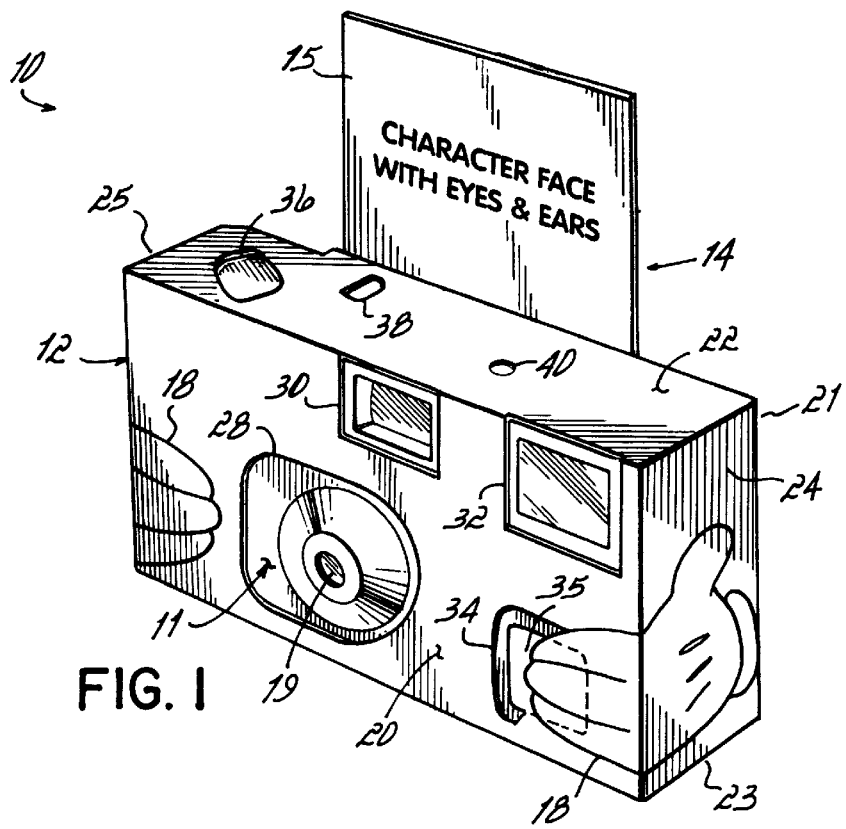
FIG. 1 is a perspective view of an attention attractor for a viewing device in accordance with a first preferred embodiment of the invention.

FIG. 1 shows an attention attractor 10 constructed in accordance with a first preferred embodiment of the invention, for use in connection with a camera 11 which is enclosed therein. More specifically, the attention attractor 10 includes an enclosure 12 for surrounding the camera 11, the enclosure 12 including a character 14 which extends outwardly therefrom. In a broader aspect of the disclosure, the invention contemplates the character 14 in combination with the enclosure 12 and the camera 11. Thus, the character 14 may be formed separately from, but then secured to, the enclosure 12. Nevertheless, in a preferred embodiment of the invention the character 14 and the enclosure 12 are integrally formed, and preferably die cut from a single sheet of material as described in further detail with respect to FIG. 2.

The enclosure 12 substantially encloses and surrounds the viewing device 11, in this instance a camera. In this manner, the enclosure 12 and/or the character 14 may be secured to the outer surface of a conventional, box-shaped housing for a camera 11. If the camera 11 is a conventional box-shaped "disposable" camera, typically with a plastic housing, the enclosure 12 and/or the character 14 may be secured to the plastic housing of the camera or to the conventional cardboard jacket of such a camera. Alternatively, the enclosure 12 and/or character 14 takes the place of such a conventional jacket. As yet another alternative, if made of sufficiently rigid material, the enclosure 12 may also substitute for the plastic housing, thereby to provide the structural support and housing for the internal components of the camera 11. Stated another way, when the camera 11 is a conventional disposable camera, this invention contemplates securing the attention attractor 10 to the external surface of the conventional box-shaped plastic housing for the disposable camera, the cardboard jacket for the camera and even the possibility of using this attention attractor 10 as the actual box-shaped structural housing for the camera 11 instead of the conventional plastic housing.

FIG. 1 shows that the character 14 includes a head 15 extending from the enclosure 12, in this instance extending upwardly from a rear, or second, side of the enclosure 12. The character 14 includes a pair of ears and a pair of eyes. Preferably, the character 14 is further defined by a pair of hands 18 located on the enclosure 12 so that it appears as if the character 14 is actually holding the viewing device 11 and looking therethrough. The hands 18 may be separate pieces of material secured to the enclosure 12, or the hands 18 may be defined by printing or otherwise applying hand indicia to the enclosure 12.

When viewed from a vantage point facing the camera 11, i.e., more specifically a vantage point facing a light entry end 19 of a lens of the camera 11, it appears to an observer as if the character 14 is holding the camera 11 and looking through the view hole of the camera 11 to take a photograph. In this way, the enclosure 12 and the character 14 are not used as part of an effort to conceal the camera 11, but rather are used in conjunction with the camera 11 so that it appears as if the character 14 is taking a photograph with the camera 11. To some children, particularly those not likely to be distracted by an object which conceals a camera, at least not more than once, this invention encourages a child to acknowledge that a photograph is being taken, but that it is being taken by a lovable and familiar character, such as a well known cartoon character. Some children may even be flattered by the thought that the lovable character 14 wishes to take the photograph. In this sense, this invention represents a different approach to attracting the attention of a child to be photographed, compared to the attention diverters described in the background section, which primarily attempt to conceal the camera from the child being photographed.

The enclosure 12 includes a first side 20, which is at the front of the camera 11, and a second side 21 located at a rear of the camera 11. FIG. 1 shows the character 14 extending upwardly from the second side 21 of the enclosure 12, because this arrangement perhaps best conveys the impression that the character 14 is using the camera 11 to take a photograph. However, the invention also contemplates various other arrangements and positions of the character 14 with respect to the enclosure 12 and the camera 11, so long as the variation is designed to attract the attention of a child and convey the thought to the child that the character 14 is somehow using or interacting with the camera 11.

The enclosure 12 further includes a top panel 22, a bottom panel 23, and two additional left and right panels 24 and 25, respectively. The first side 20 includes a lens opening 28, a view opening 30, a flash access opening 32, and a flash button opening 34. Preferably, the flash button opening 34 is shaped to define a foldable tab 35 on the first side 20, to permit depressable actuation of the flash. The top panel 22 includes a push-button opening 36, a film count opening 38 and a flash indicator opening 40, to permit the push-button taking of a photograph, viewing of the number of photographs already taken on the film roll and a visual indication as to whether or not the flash is ready, respectively.

Figure 2:
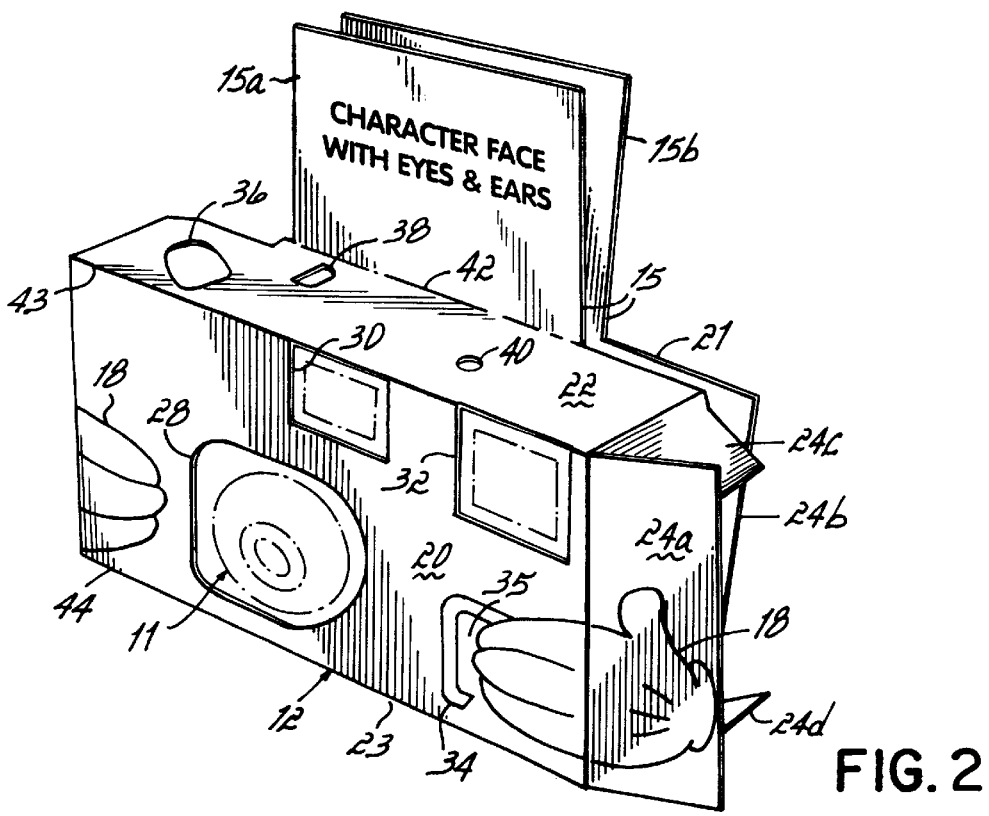
FIG. 2 is a plan view of a blank, or sheet, of material which is used to form the inventive attention attractor shown in FIG. 1.
Figure 3:
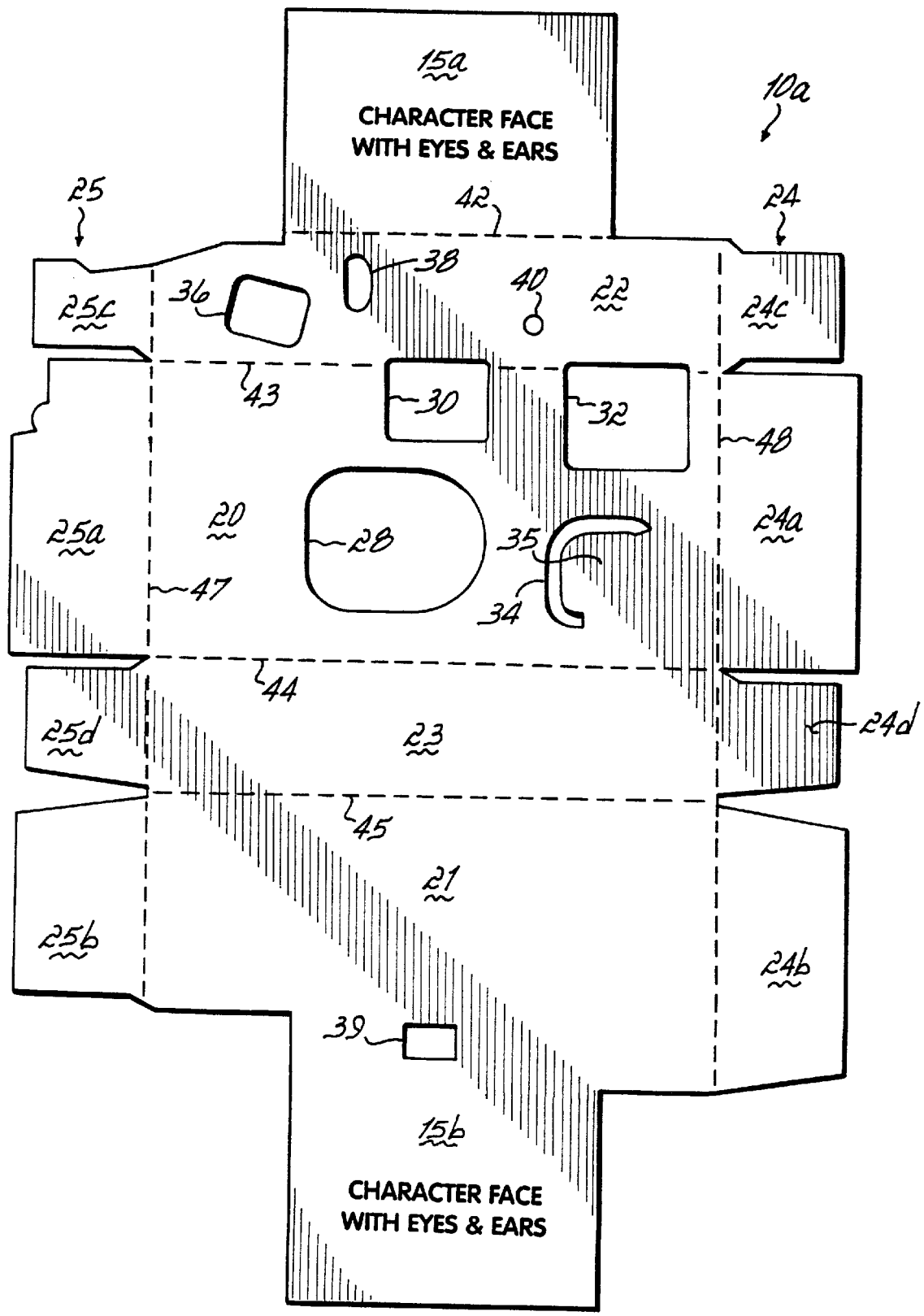
FIG. 3 is a perspective view of the sheet of FIG. 2 after it is has been substantially formed about a viewing device to define an enclosure therefor.

FIG. 2 shows a plan view of a blank 10a of material, preferably cardboard, which has been die cut to a predetermined shape to permit forming the enclosure 12 by folding about the camera 11. Once the sheet has been cut to this predetermined shape, it is then folded along transverse fold lines 42, 43, 44 and 45 to substantially enclose and surround the viewing device 11. The spaced longitudinal fold lines 47 and 48 define sections which, when folded to form a box shape, will overlap and define the panels 24 and 25 of the enclosure 12. More specifically, sections 24a and 25a will define the outer portions of the panels 24 and 25, respectively, with inner sections 24b and 25b being overlapped thereby after folding. After folding the sheet to define the enclosure 12, a pair of spaced upper tabs 24c and 25c and a pair of spaced lower tabs 24d and 25d are also folded over the side edges of the camera 11 and located inside of the outer sections 24a and 25a, as shown in FIG. 3. These folded portions may be secured by adhesive which is applied manually, or via an automated process, as part of the overall process of folding and enclosing the camera 11 within the enclosure 12. The particular manner of folding is not critical, so long as the sections 24a, 25a with the hand indicia thereon are located on the outside, and so long as the folded components are secured in the folded position.

The head 15 of the character 14 is defined by two overlapping plies 15a and 15b, with 15a being forward of rearward ply 15b. Forward ply 15a is defined by the longitudinal fold line 42. Preferably, plies 15a and 15b which define the head 15 are secured together by adhesive. FIG. 2 also clearly shows a view opening 39 in the second side 21 of the enclosure 12, to permit viewing therethrough by a person using this attention attractor 10 for the purpose of taking a photograph.

Figure 4:
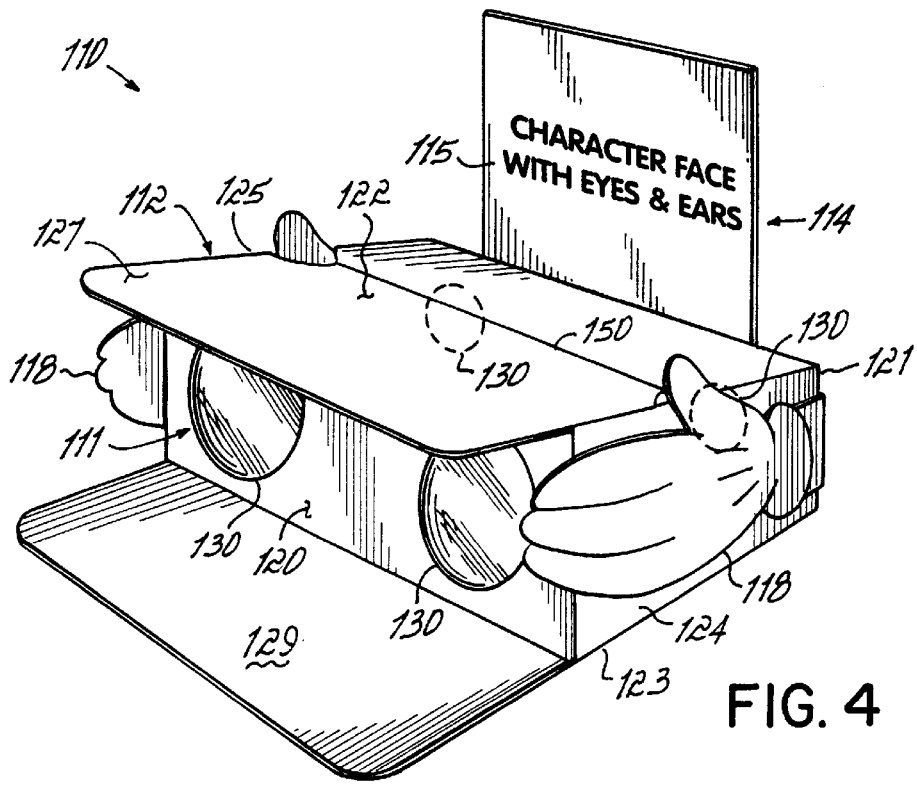
FIG. 4 is a perspective view of an attention attractor in accordance with the second preferred embodiment of the invention, wherein the viewing device is a pair of binoculars.

The invention also contemplates a second preferred embodiment of the invention, wherein the attention attractor 110 forms an enclosure 112 for a different type of viewing device, particularly a pair of binoculars 111 with two spaced lenses as shown in FIG. 4. Preferably, the binoculars 111 are foldable disposable binoculars 111 wherein each lens comprises a front light entry piece spaced from and separate from an aligned second viewing piece. In this embodiment, as acknowledged but not depicted with respect to the first embodiment, the enclosure 112 forms the structural housing 112 for the viewing device 111.

This variation of the invention also includes a character 114 defined by a head 115 with a pair of ears and a pair of eyes, along with an enclosure 112 including a pair of hands 118 to make it appear as if the character 114 is holding the viewing device 111 and looking therethrough. This variation of the invention performs an amusement, or perhaps educational, feature. More particularly, this form of the invention may encourage children to use a pair of binoculars 111 to observe friends at a distance, and to perhaps arouse the child's curiosity about the optical principles which allow viewed images to appear larger than with the unaided eye.

The attention attractor 110 shown in FIG. 4 includes a first front side 120 and a second rear side 121, with the first side 120 including a pair of spaced view openings 130 to provide light access for the light entry ends of a pair of forward-mounted lenses of the binoculars 111. The second rear side 121 of this attention attractor 110 also includes a pair of viewing openings 139 to permit a person using the binoculars 111 to look therethrough, preferably into a pair of rearward-mounted lenses aligned with the forward lenses. Alternatively, the attractor 110 may be provided with no lenses at all. In addition to a top panel 122, a bottom panel 123 and left and right panels 124 and 125, this embodiment of the invention includes an upper glare panel 127 and a lower glare panel 129 located above and below, respectively, the lens openings 130 in the first side 120 of the enclosure 112.

Figure 5:
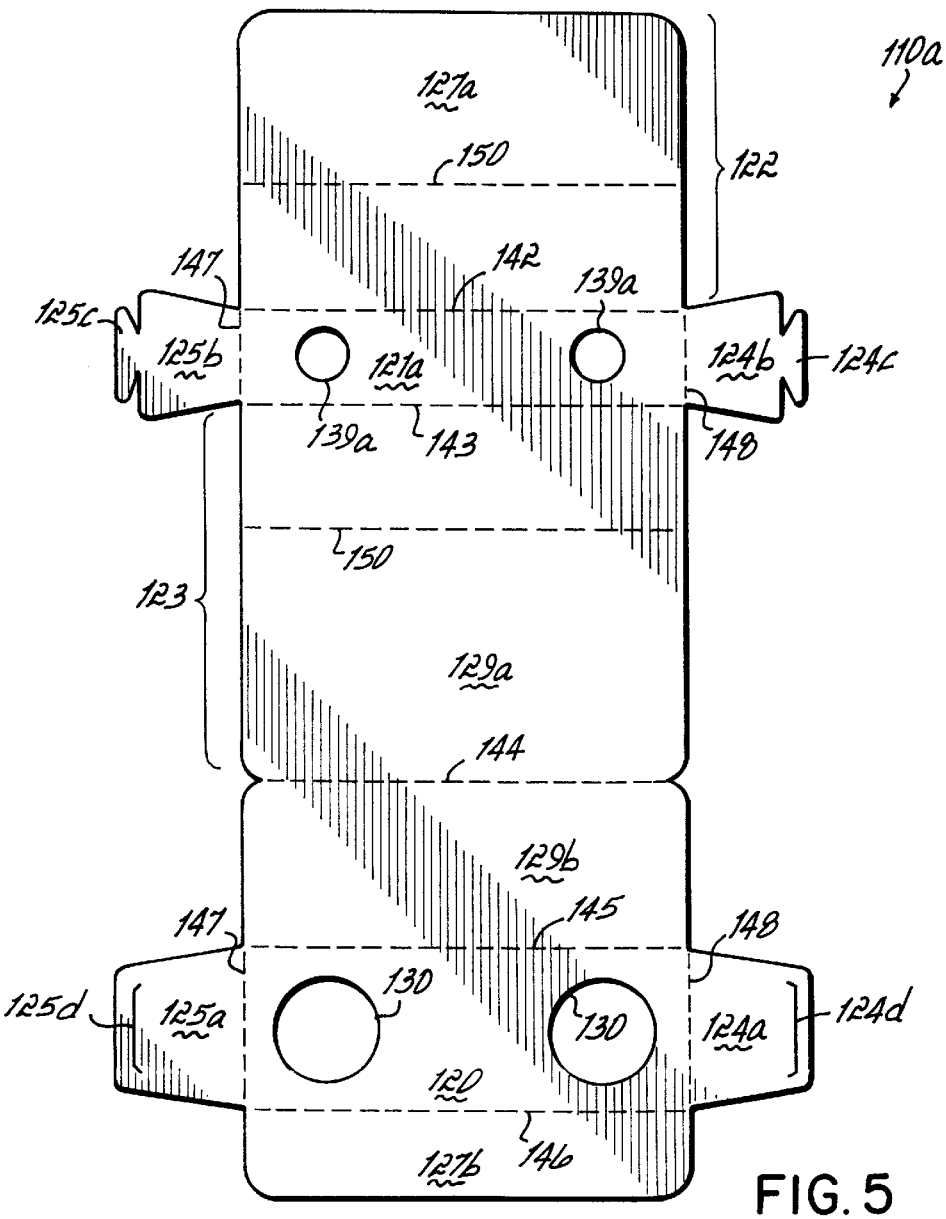
FIGS. 5 and 6 are plan views of blanks, similar to FIG. 2, which are used to form the attention attractor shown in FIG. 4.
Figure 6:
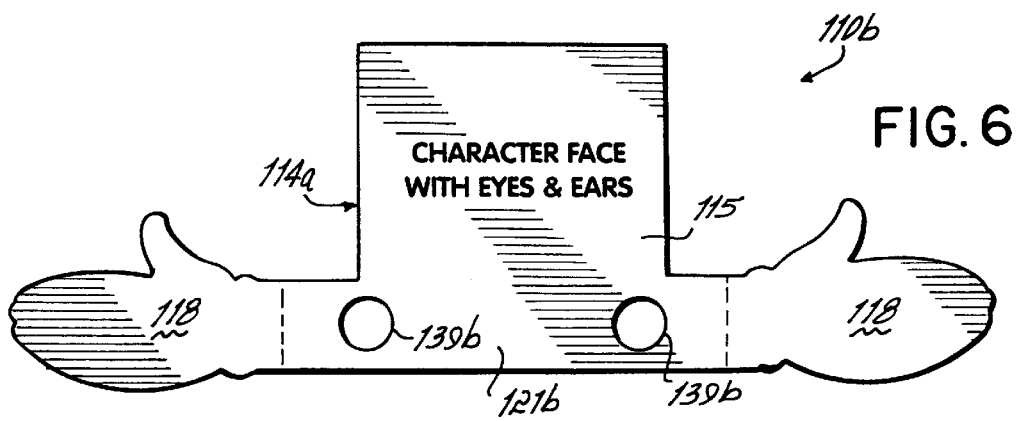

FIGS. 5 and 6 show separate blanks 110a and 110b, respectively, preferably of cardboard, similar to FIG. 2 with respect to the first preferred embodiment of the invention, for die cutting two separate pieces to predetermined shapes for forming the attention attractor 110 for substantially surrounding and enclosing the binoculars 111. Again, as with the first preferred embodiment of the invention shown in FIG. 2, the die cut sheet 110a shown in FIG. 5 is folded along transverse fold lines 142–146 to define a generally box-shaped structure for enclosing and substantially surrounding, or alternatively for defining the binoculars 111. Preferably, the enclosure 112 includes fold lines 150 on the top and bottom to promote collapsability or foldability. Also, when the blank 110a of FIG. 5 is folded, panel 127 is formed by dual overlapping sections 127a and 127b, and panel 129 is formed of dual overlapping sections 129a and 129b.

Figure 7:
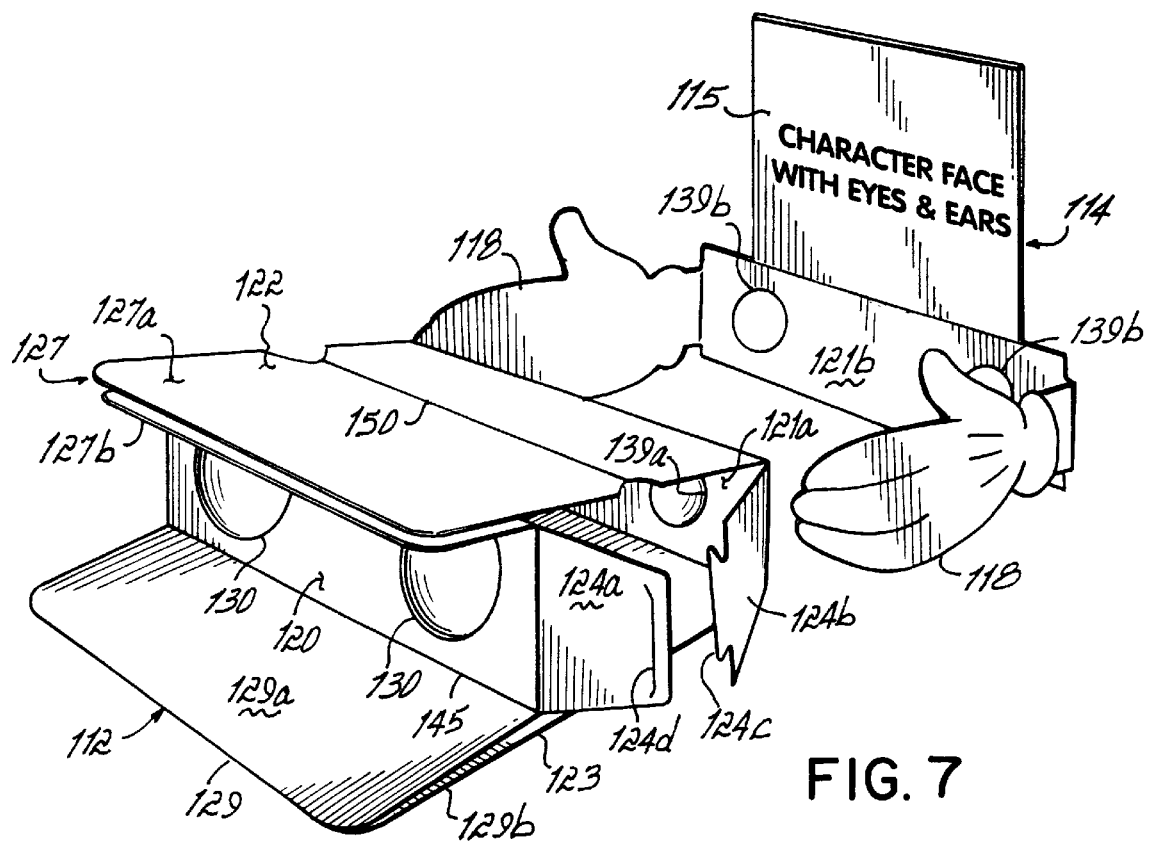
FIG. 7 is a perspective view showing the attention attractor of FIG. 4 in partially assembled form, after folding and arranging the blanks shown in FIGS. 5 and 6.

Although the attention attractor 110 of the second preferred embodiment of the invention could be formed from a single sheet, applicant presently considers it preferable to form this attention attractor 110 out of two separate sheets, and FIG. 6 shows the second sheet 110b which is then secured to the first sheet in the manner shown in FIG. 7. In this manner, both the sheets 110a and 110b include overlying sections 121a and 121b which form the second rear side 121 of the enclosure 112, with aligned pairs of view openings 139a and 139b formed therein to enable a user to see through the lenses of the binoculars 111. The hands 118 foldably extend forwardly from the rear section 121b, to cover the left and right panels 124 and 125. Preferably, each of the left and right panels 124 and 125 is defined by two folded flaps 124a and 124b, 125a and 125b, respectively. The flaps 124b, 125b include a tab 124c, 125c sized to be received within a slit opening 124d, 125d cut into the opposite flap 124a, 125a, as shown in FIG. 7. The character 114 extends upwardly from the second side 121, and specifically upwardly from section 121b of the second sheet 110b of material.

While two preferred embodiments of the invention have been disclosed, it will be readily understood by those skilled in the art that the invention is subject to numerous other variations for attracting attention to a viewing device. For instance, the character 14, 114 may be depicted in a manner which creates the impression that the viewing device 11, 111 is being used, but not necessarily being looked through by the character 14, 114. Moreover, the invention contemplates a wide variety of viewing devices, not just cameras or binoculars. Also, although the disclosed embodiments include openings in the enclosure 12, 112 to permit light passage, it would also be possible to cover these openings with a transparent material, such as plastic. In view of these and other potential variations of the invention, the two disclosed preferred embodiments should not be interpreted as restricting or limiting the scope of the following claims.

We claim:

1. An attention attracting article for calling attention to a viewing device having a viewing end and a light entry end having a lens, comprising:

an enclosure comprising a folded sheet of material adapted to substantially surround the viewing device, the enclosure having at least one lens hole through a first side thereof to permit light passage to the lens of the viewing device, said first side adapted to abut the light entry end of the viewing device;

a character comprising a sheet of material extending outwardly from the enclosure on a second side thereof, said second side adapted to abut the viewing end of the viewing device; and character hand indicia on at least a third and a fourth side of the enclosure.

2. The attention attracting article of claim 1 wherein the viewing device is a camera.

3. The attention attracting article of claim 1 wherein the viewing device is a pair of binoculars.

4. The attention attracting article of claim 1 wherein the enclosure is cardboard.

5. The attention attracting article of claim 1 wherein the lens hole is an opening through the first side of the enclosure.

6. The attention attracting article of claim 1 wherein the character includes a head and ears.

7. The attention attracting article of claim 1 wherein an outwardly directed surface of the first side includes hand indicia.

8. The attention attracting article of claim 1 wherein the character extends outwardly and upwardly from the second side of the enclosure, the second side located opposite the first side.

9. The attention attracting article of claim 1 wherein the enclosure and the character are integral.

10. The attention attracting article of claim 1 wherein the enclosure comprises a structural housing for the viewing device.

11. In combination, the invention comprising:

a viewing device including a viewing end and a light entry end having at least one lens;

an enclosure comprising a folded sheet of material substantially surrounding the viewing device but permitting an operator to look therethrough from the viewing end;

a character comprising a sheet of material extending outwardly from the enclosure on a first side which abuts the viewing end; and character hand indicia on at least a second and a third side of the enclosure.

12. The invention of claim 11 wherein the viewing device is a camera.

13. The invention of claim 11 wherein the viewing device is a pair of binoculars.

14. The invention of claim 11 wherein the character includes a head.

15. The invention of claim 11 wherein the enclosure is box-shaped, with at least some portion of the character extending outwardly from the box shape adjacent the viewing end of the viewing device.

16. The invention of claim 11 wherein the enclosure and the character are integral.

17. The invention of claim 16 wherein the character comprises at least two layers of sheet material.

18. A method of making an attention attractor for a viewing device having a first viewing end and a second light entry end with a lens, comprising:

substantially enclosing the viewing device with at least one sheet of material having character hand indicia, by folding a sheet of material about the viewing device in a manner such that the sheet of material does not obstruct the first viewing end or the second light entry end of the viewing device, forming a character from a sheet of material extending outwardly from the viewing device from the first viewing end of the viewing device, and the character hand indicia extending along at least two surfaces of the sheet of material when folded about the viewing device.

19. The method of claim 18 further comprising:

prior to the forming step, die cutting the at least one sheet of material to a predetermined shape.

20. The method of claim 18 further comprising:

prior to the forming step, applying indicia on the at least one sheet of material to define the character.

21. The method of claim 20 wherein the applied indicia defines a head portion of the character.

22. The method of claim 18 wherein the forming step is accomplished via folding the at least one sheet of material.

* * * * *